Jan. 21, 1958 LA VERNE R. PHILPOTT ET AL 2,820,891

PULSE FREQUENCY MODULATION TRANSMISSION SYSTEM

Original Filed April 30, 1940 4 Sheets-Sheet 1

INVENTORS
LA VERNE R. PHILPOTT
ROBERT M. PAGE

BY W. R. Maltby

ATTORNEYS

Jan. 21, 1958 LA VERNE R. PHILPOTT ET AL 2,820,891

PULSE FREQUENCY MODULATION TRANSMISSION SYSTEM

Original Filed April 30, 1940 4 Sheets-Sheet 2

INVENTORS
LA VERNE R. PHILPOTT
ROBERT M. PAGE

BY W. R. Maltby

ATTORNEYS

POTENTIAL BETWEEN GRIDS AND CATHODES OF TUBES 1 AND 1a

RF AMPLITUDE AT ANODES OF TUBES 1 AND 1a

POTENTIAL ACROSS 39 OF FIG. 1

INVENTORS
LA VERNE R. PHILPOTT
ROBERT M. PAGE

BY W R Maltby

ATTORNEYS

PULSE FREQUENCY MODULATION TRANSMISSION SYSTEM

Original Filed April 30, 1940 4 Sheets-Sheet 4

INVENTORS
LA VERNE R. PHILPOTT
ROBERT M. PAGE

BY W R Maltby

ATTORNEYS

United States Patent Office 2,820,891

Patented Jan. 21, 1958

2,820,891

PULSE FREQUENCY MODULATION TRANSMISSION SYSTEM

La Verne R. Philpott, Newark, N. J., and Robert M. Page, Camp Springs, Md., assignors, by mesne assignments, of one-third to Robert M. Page, one-ninth to Harold G. Bowen, one-twelfth to La Verne R. Philpott, one-fourth to Leo C. Young and two-ninths to Burns, Doane, Benedict & Irons, a partnership Original application April 30, 1940, Serial No. 332,526, now abandoned. Divided and this application March 3, 1952, Serial No. 274,642

1 Claim. (Cl. 250—17)

(Granted under Title 35, U. S. Code (1952), sec. 266)

This invention relates to pulse frequency modulation of high frequency pulse transmitting apparatus. This application is a division of our application entitled Pulse Transmitter Systems filed April 30, 1940, Serial Number 332,526, now abandoned.

It is a primary purpose of the invention to provide communication by varying the interval between successive uniform pulses of a series in accordance with a signal to be transmitted. A further object is to provide means for modulating high carrier frequency pulses at voice frequency.

The invention will be further described with reference to the exemplary embodiment shown in the drawing, wherein.

Figure 1:
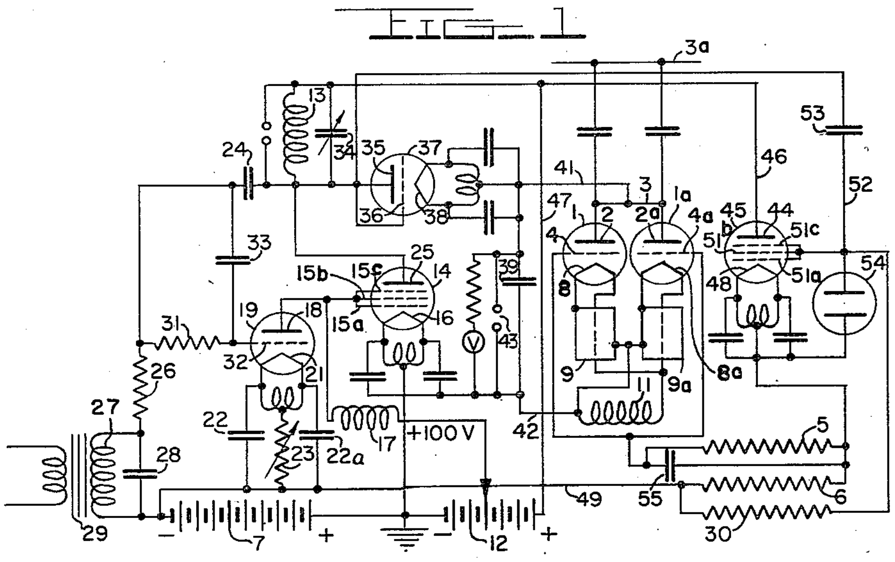
Figure 1 is a pulse transmitter system suitable for use in the invention.

A pulse transmitter system wherein the transmitter tube is unblocked by changes in grid potential is shown in Fig. 1. While this is illustrated as being an extremely high frequency system, this is not essential. The two transmitter tubes 1 and 1*a* have anodes 2 and 2*a* connected in high frequency push-pull, and delivering power through the high frequency tank circuit 3, which is a parallel-wire transmission line resonant circuit to the antenna 3*a* and their grids 4 and 4*a* connected in high frequency push-pull and through resistances 5 and 6 to the negative terminal of source 7, the cathodes 8 and 8*a* being supplied with heater power through high frequency push-pull impedance elements 9 and 9*a* from a transformer secondary 11.

Energy for generating the pulses is drawn from source 12 through storage inductance 13 and power pentode 14 having its three grids 15*a*, 15*b* and 15*c* connected together and its cathode 16 connected to the negative terminal of source 12 and to ground, the grids 15*a*, 15*b* and 15*c* being connected through impedance 17 to a point 100 volts positive with respect to ground on source 12. Anode 18 of blocking tube 19 is also connected to the 100 volts positive point on source 12 through impedance 17, the cathode 21 of tube 19 being connected to the negative terminal of source 7 through capacitances 22 and 22*a* in parallel with variable resistance 23. Capacitance 24 is connected at one side to a point between inductance 13 and anode 25 of tube 14 and at its other side to a time constant resistance 26 that is connected through transformer secondary 27 to the negative terminal of source 7. Capacitance 28 completes the circuit for the synchronizing pulses applied through transformer 29.

Grid resistance 31 is connected to a point between capacitance 24 and resistance 26 and to grid 32 of blocking tube 19 and is by-passed with a small capacitance 33. A variable capacitance 34 is connected in parallel with storage inductance 13, and the terminals of inductance 13 and capacitance 34 that are connected to anode 25 are connected to the anode 35 and grid 36 of a rectifier tube 37 whereof the cathode 38 is connected to storage capacitance 39 that supplies energy to anodes 2 and 2*a* and cathodes 8 and 8*a*, respectively, of transmitter tubes 1 and 1*a* through leads 41 and 42, respectively. It is to be understood that capacitance 39 is relatively large for the storage of energy in an amount several times that released for individual pulse generation. A safety gap 43 is connected across storage capacitance 39.

Anode 44 of keying tube 45 is connected through leads 46 and 47 to the positive terminal of source 12 and the cathode 48 thereof is connected through resistance 6 and lead 49 to the negative terminal of source 7 which is in series with source 12. Tube 45 is a pentode having its grids 51*a*, 51*b* and 51*c* connected together and, through lead 52 and capacitance 53, to the anode 35 of rectifier tube 37 and likewise to the anode 25 of tube 14. A reduced pressure safety gap 54 is connected between grids 51*a*, 51*b* and 51*c* and cathode 48 of keying tube 45.

The operation of this form of our invention is as follows: After one cycle of operation, the cathode 21 of tube 19 is held positive by the charge on capacitances 22 and 22*a* and hence tube 19 is blocked and draws no current. The grids 15*a*, 15*b* and 15*c* of charging tube 14 are 100 volts positive by their connection to source 12 and the anode 25 is likewise positive due to its connection to the positive terminal of source 12. Transmitter tubes 1 and 1*a* are blocked by connection of grids 4 and 4*a* to the negative terminal of source 7, as is keying tube 45 by virtue of its grids 51*a*, 51*b* and 51*c* being held negative relative to cathode 48 by charge on condenser 53.

Under the conditions above set forth, tube 14 draws current through storage inductance 13 with concomitant storage of energy therein and the voltage on anode 25 will rise along the $E_p$—$I_p$ curve of tube 14 until a critical value of current is reached, when the voltage on anode 25 will increase very rapidly. This pulse of positive voltage is transmitted through capacitance 24 and small capacitance 33 to grid 32 of blocking tube 19 which is thereby unblocked and begins to draw current through impedance 17, and the resulting drop through impedance 17 is applied to grids 15*a*, 15*b* and 15*c* of tube 14 to block the charging tube 14. Capacitance 24 must charge through time constant resistance 26 and the duration of this charge is given such value that tube 19 is held conducting, and thereby tube 14 is held blocked, until the energy stored in inductance 13 is transferred through rectifier tube 37 to storage capacitance 39, the rectifier 37 having been rendered conducting by high positive potential developed on the anode 25 of tube 14. The purpose of rectifier tube 37 is to prevent the high potential of storage capacitance 39 working back into the other elements of the system.

As soon as the potential on anode 25 begins to increase rapidly, a positive pulse is impressed upon grids 51*a*, 51*b* and 51*c* of keying tube 45 through lead 52 and capacitance 53, which unblocks keying tube 45 and the resultant flow of current through tube 45 and resistance 6 in series therewith gives rise to a positive potential that is impressed upon grids 4 and 4*a* of transmitter tubes 1 and 1*a* through small capacitance 55, thereby transiently unblocking transmitter tubes 1 and 1*a* and permitting the discharge of energy from storage capacitance 39 through the transmitter tubes 1 and 1_a_, with the concomitant generation of a very short pulse of extremely high frequency energy at a high power level, the pulse being radiated from antenna 3_a_. It is to be understood that the generation and radiation of the pulse take place during the rise of potential on anode 25 and that the pulse is substantially complete before rectifier 37 has become conducting to transfer to storage capacitance 39 the energy in storage inductance 13. The transmitter tubes 1 and 1_a_ in Fig. 2 being grid voltage controlled, objectionable frequency changes arising from anode voltage control are eliminated.

By way of example, if inductance 13 has a value of L of 0.407 henry, the pulse frequency be 3,000 pulses per second and the peak current I through inductance 13 be 0.7 ampere, the energy stored per cycle is ½ $LI^2$ or 0.10 joule. If the equivalent value of capacitances 24, 34 and 53 be 350 mircomicrofarads, the peak voltage to which capacitance 39 would charge in the absence of any drain would be 23,900 volts.

Figures 2, 3, 4:
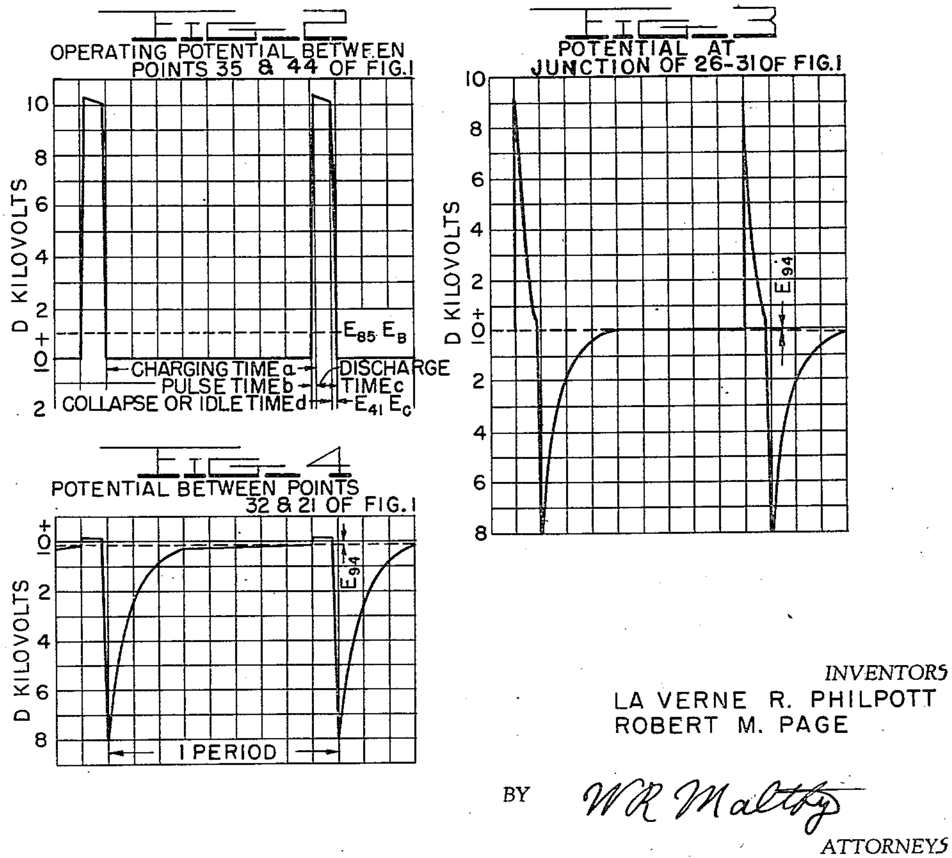
Figures 2 through 13 are graphs illustrating the variations of potential at various points of Fig. 1.

Consideration of the graphs in Figs. 2 to 13 will aid in understanding the sequence of voltage and current conditions in various parts of the system of Fig. 1 during a cycle. Referring first to Fig. 2, the charging time _a_ is that interval during which the tube 14 is passing current and storing up energy in the storage inductance 13. When the critical value of current is reached and the potential on anode 25 begins to rise rapidly the impulse of positive potential is transmitted through lead 52 and capacitance 53 to the grids of tube 45 giving rise to the pulse which is designated by _b_ in Fig. 2. It will be noted that this is very short and occurs during the rapidly rising anode potential. The discharge time _c_ is the interval during which the energy is being transferred from inductance 13 through rectifier 37 to capacitance 39, and the collapse or idle time _d_ is the interval during which the potential on anode 25 is dropping. It will be observed that the potential of anode 25 reaches a value in excess of 10 kilovolts.

Fig. 3 shows the excitation potential at the junction of resistances 26 and 31, while Fig. 4 shows the actual grid excitation of tube 19. It will be understood that when a very high positive excitation is applied to grid 32 this grid will tend to draw a heavy grid current which would charge condenser 24 too rapidly, and consequently resistance 31 must be of sufficient value to hold this current to an allowable value.

Figure 5:
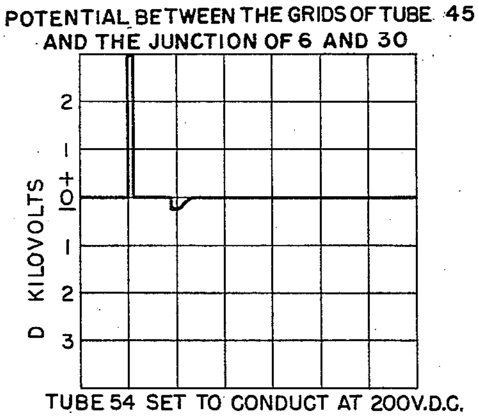
Figure 6:
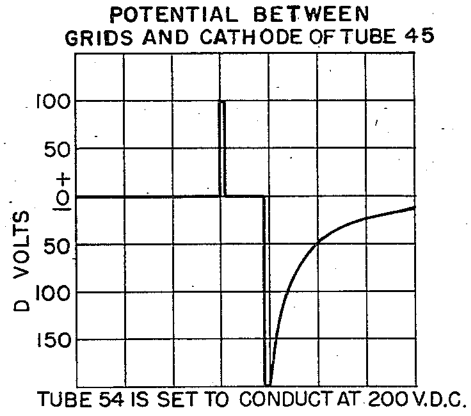

Fig. 5 shows the excitation between grids 51_a_, 51_b_ and 51_c_ of tube 45 and the negative side of source 7 while Fig. 6 illustrates the net effective voltage on the grids of tube 45. It will be observed in Fig. 6 that the maximum positive voltage on grids 51_a_, 51_b_ and 51_c_ is 100 volts and consequently setting safety gap tube 54 to discharge at 200 volts allows an ample margin for voltage variation during operation and yet the tube will be protected against negative potential swings on the grids 51_a_, 51_b_ and 51_c_ sufficiently great to damage the same. If tube 45 is sufficiently well insulated to withstand the full excitation, tube 54 may be eliminated with no effect on the operation save that it will require a longer time for condenser 53 to discharge through resistance 30.

Figure 7:
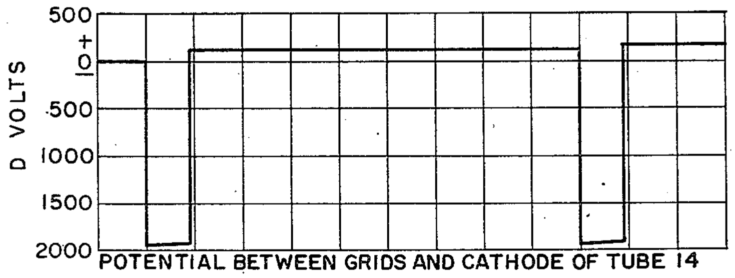
Figure 8:
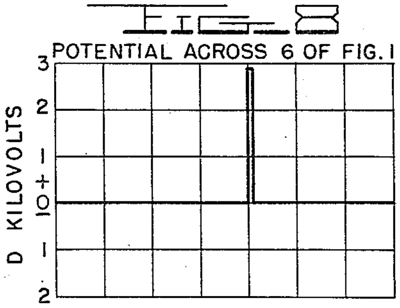
Figure 9:
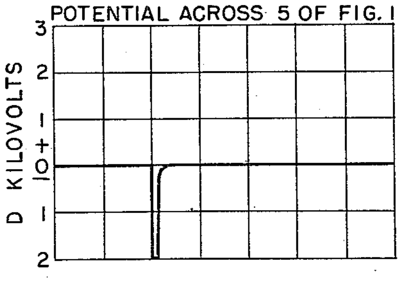
Figure 10:
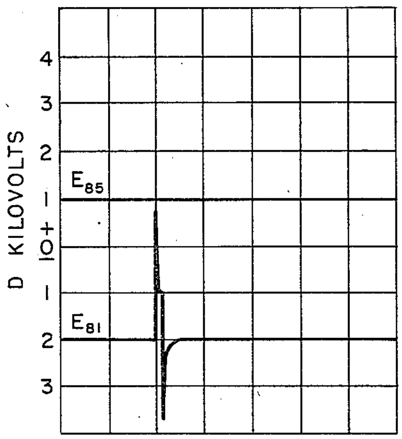
Figure 11:
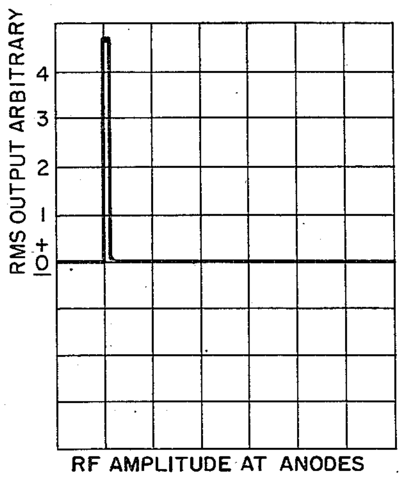

Fig. 7 depicts the grid potential on tube 14. Fig. 8 depicts graphically the potential developed across resistance 6 by the flow of current through tube 45 and consequently the voltage applied to grids 4 and 4_a_ of transmitter tubes 1 and 1_a_. Fig. 9 shows the drop across resistance 5 due to grid current from the transmitter tubes 1 and 1_a_, while the net operating potential on transmitter grids 4 and 4_a_ is shown in Fig. 10, the resultant amplitude of the radio frequency pulse being plotted in Fig. 11.

Figure 12:
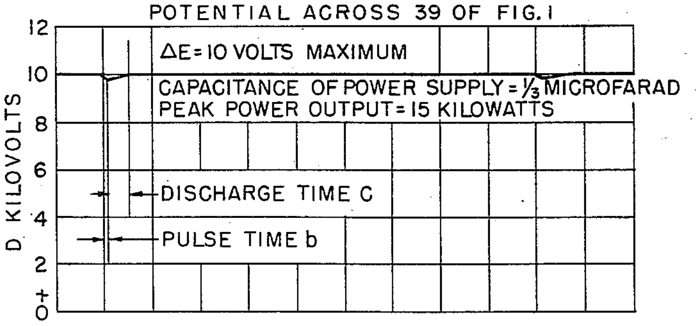

Fig. 12 shows the small ripple voltage across capacitance 39 due to discharging through tubes 1 and 1_a_ and the charging through tube 37 where capacitance 39 has a value of ⅓ microfarad and the peak of transmitter input power is 15 kilowatts.

Figure 13:
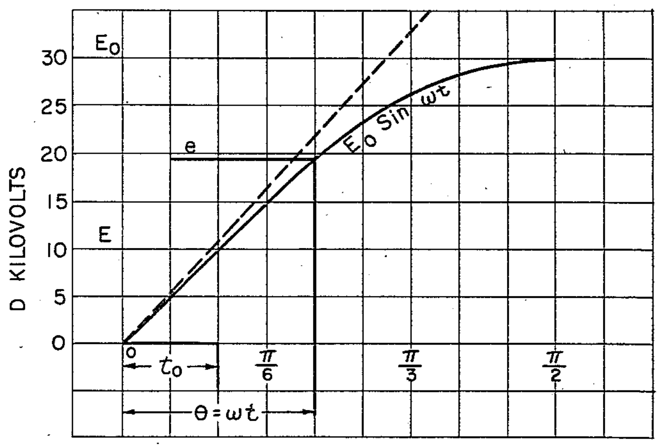

Figure 13 shows the charging of condenser 34 on a unit time scale which is the period of inductance 13 loaded by capacity 34 and other elements. $E_0$ is the peak voltage of the resonant system alone, and _e_ represents the voltage on condenser 39 which limits the charge on 13 by conduction of tube 37.

Figure 14:
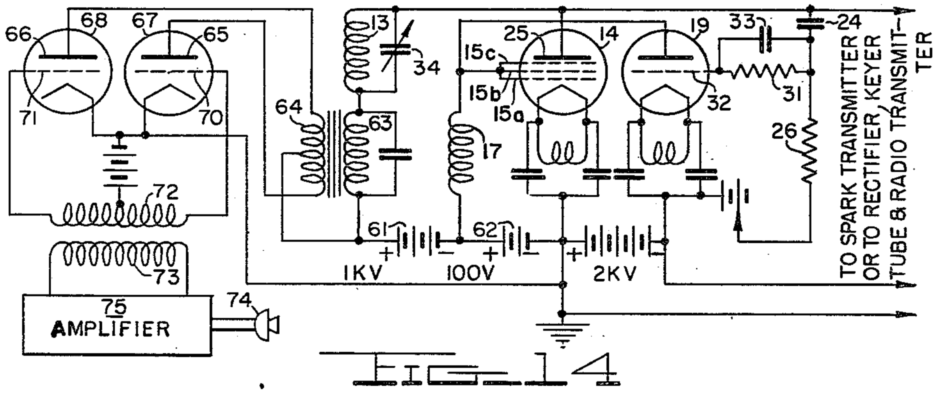
Figure 14 illustrates means for frequency modulating pulses transmitted by the circuit of Figure 1.

Fig. 14 illustrates a system for modulating intelligence upon the pulse signals. Inasmuch as the greater part of the system shown in Fig. 1 is unchanged it is not repeated in Fig. 14. As has been above stated, the pulse frequency depends upon the anode supply voltage and the characteristics of the charging tube 14. With all operating potentials having a certain value, the frequency will be determined. However, a variation in the voltage from sources 61 and 62 will result in changing the frequency.

The tube 14 draws current from sources 61 and 62 and stores up energy in inductances 13 until the voltage of anode 25 increases greatly, which increase is transmitted through capacitances 24 and 33 to grid 32 of blocking tube 19. The blocking tube 19 then becomes conducting and draws current through inductance 17 and renders charging tube 14 non-conducting. The transformer secondary 63 is in series between inductance 13 and sources 61 and 62. The primary 64 coupled to a secondary 63 has its opposite ends connected to the anodes 65 and 66 of tubes 67 and 68, respectively. The grids 70 and 71 of tubes 67 and 68 are connected to opposite ends of transformer secondary 72 upon which are impressed through primary 73 voltage fluctuations corresponding to speech picked up by microphone 74 and amplified in amplifier 75. It is apparent that the augmented variations in voltage corresponding to speech will be impressed upon the plate voltage supply of tube 14 and hence the frequency of the pulses will be changed correspondingly.

Figure 15:
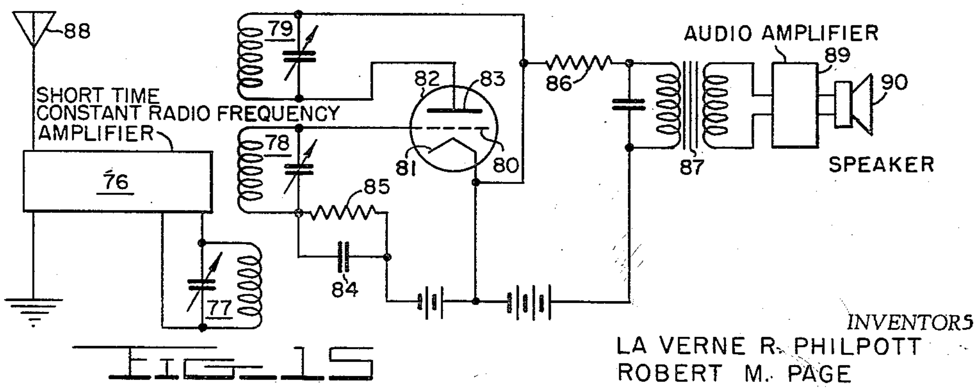
Figure 15 shows receiving and demodulating circuits for deriving the intelligence from frequency modulated pulses.

The reception of speech modulated pulses derived as set forth in connection with Fig. 14 may be accomplished by the system depicted in Fig. 15. The receiver 76 is preferably of the type disclosed in a co-pending application Serial No. 223,502 of Young and Page, now Patent No. 2,554,515. The output of receiver 76 is coupled by means of circuit 77 with oscillatory circuits 78 and 79, the former being connected to grid 80 and cathode 81 of tube 82 and the latter to anode 83 and through resistance 86 and the primary of transformer 87 to the potential supply. The oscillations set up in circuits 78 and 79 continue until capacitance 84 is sufficiently charged by a rectified grid current to bias grid 80 sufficiently negative to render tube 82 non-conducting, resistance 85 being high enough to quench oscillations, and low enough to discharge condenser 84 between pulses. Tube 82 should be so biased that oscillations are initiated by the received signal. As a result of this operation, a certain quantity of electricity will pass through tube 82, resistance 86 and transformer 87 into capacitance 84 during a definite time interval, charging capacitance 84 to such potential that tube 82 becomes non-conducting, and this charge then is dissipated in time for the next pulse.

Now the average plate current flowing through tube 82 will depend solely upon the frequency of the pulses received by antenna 88 and amplified in receiver 76. This plate current then will have a component which will reproduce in transformer 87, audio amplifier 89, and reproducer 90 the wave form applied to microphone 74 in Fig. 15. It is obvious that this type of communication is advantageous since the signal levels received may be well above the noise level and are therefore comparatively free from interference.

The invention described herein may be manufactured and/or used by or for the Government of the United States of America for governmental purposes without the payment of any royalties thereon or therefor.

What is claimed is:

A radio frequency pulse transmitter comprising a radio frequency oscillator including an electron discharge device having a cathode, an anode and a control electrode, keying means normally applying a blocking potential to said control electrode, energy storage means for said anode, means generating a series of high power rectangular impulses of short duration at successive intervals each the reciprocal of a single frequency, means applying said rectangular impulses to said keying means to apply an unblocking potential to said control electrode, means applying said rectangular impulses to said energy storage means, a source of audio frequency oscillations, and means varying the frequency of said series of rectangular impulses in accordance with said audio frequency oscillations.

References Cited in the file of this patent

UNITED STATES PATENTS

| | | |
|---|---|---|
| 2,061,734 | Kell | Nov. 24, 1936 |
| 2,541,092 | Page | Feb. 13, 1951 |